US005160517A

United States Patent [19]

Hicks et al.

[11] Patent Number: 5,160,517

[45] Date of Patent: Nov. 3, 1992

[54] SYSTEM FOR PURIFYING AIR IN A ROOM

[76] Inventors: Richard E. Hicks, 108 Devonshire Rd., Waban, Mass. 02168; Richard R. Fenner, 20 Willage Dr., Walpole, Mass. 02081

[21] Appl. No.: 841,191

[22] Filed: Feb. 20, 1992

Related U.S. Application Data

[63] Continuation of Ser. No. 616,664, Nov. 21, 1990, abandoned.

[51] Int. Cl.[5] .......... B01D 46/00

[52] U.S. Cl. .......... 55/385.1; 5/423; 297/180; 55/279; 55/473

[58] Field of Search .......... 55/385.1, 279, 473; 5/421, 423; 297/180

[56] References Cited

U.S. PATENT DOCUMENTS 3,097,505 7/1963 Smith .......... 297/180
3,724,172 4/1973 Wood .......... 55/DIG. 29
4,385,911 5/1983 Popeil et al. .......... 55/472
4,737,173 4/1988 Kurdirka et al. .......... 55/472
4,749,390 6/1988 Burnett et al. .......... 55/467

FOREIGN PATENT DOCUMENTS 1123220 2/1962 Fed. Rep. of Germany .......... 297/180

OTHER PUBLICATIONS

Clean Room International, Inc. "Clean Lab Bench" brochure.

*Primary Examiner*—Bernard Nozick
*Attorney, Agent, or Firm*—Robert F. O'Connell

[57] ABSTRACT

A system for indoor pollution control that purifies ambient air in a room. The air-purification components can be housed, for example, in an item of ordinary furniture such as a chair. This allows large components capable of high purification rates to be used, but without the large space requirements hitherto normally required with previously known high-rate systems. In addition, the air flow is directed so that a localized spatial zone can be preferentially purified without the need for physical enclosures. The system can be used to prevent dispersion of harmful substances such as pathogens or tobacco smoke that originate from a source, and can also create a microenvironment of purified air.

7 Claims, 3 Drawing Sheets

SYSTEM FOR PURIFYING AIR IN A ROOM

This is a continuation of copending application Ser. No. 07/616,664 filed on Nov. 21, 1990 now abandoned.

INTRODUCTION

This invention relates generally to indoor pollution control systems and, more particularly, to a relatively compact system for providing a high rate of purification of ambient air in a room or, preferably, in a localized spatial zone or region within a room.

BACKGROUND OF THE INVENTION

It is desirable to be able to prevent the general dispersion into a room, or other enclosed space, of airborne contaminants such as tobacco smoke, aerosolized drugs, and microorganisms that are emitted from a localized source within the room. It is further desirable to be able to better protect an individual or particular equipment at a localized region of a room from exposure to contaminants that exist in the ambient air of the room. Such a system should provide a relatively even and high rate of air cleaning where space cannot readily be allocated to conventionally used purification equipment.

Many situations arise in which contaminants that are aesthetically undesirable or potentially physically harmful must be removed from the ambient air. An example is the release of pathogenic microorganisms by infected patients in waiting rooms, examining rooms, and hospital wards. A specific problem arises in aerosol therapy, for example, in the treatment of HIV-positive patients with aerosolized pentamidine. During treatment, some of the aerosolized pentamidine escapes from the treatment device and disperses into the air. Further, additional pentamidine can be expelled into the air on droplet nuclei as a result of coughing that is induced in the patient by the treatment process. The attending medical staff have to be protected from the aerosol since chronic exposure to pentamidine reportedly has adverse health effects. The problem is compounded in cases where the patient has an infectious disease such as tuberculosis.

Tobacco smoking is prohibited in many public places to protect against the potentially adverse health effects of "passive smoking." The provision of designated areas for smoking is uneconomic, non-productive, and exasperates employees previously accustomed to smoking in their own offices. A means for preventing the release of tobacco smoke from the immediate vicinity of the smoker would alleviate these problems.

Carpentry is another activity in which a pollutant is emitted from a localized source. Indoor home workshops generate voluminous quantities of sawdust, for example, that are a considerable nuisance and are potentially harmful.

In the examples given above, the pollutant is generated in a localized area, and it is desired to prevent it from dispersing into the surrounding air. A reverse situation can also exist where a person or piece of equipment must be protected from pollutants that may generally exist in the ambient air and to which such person or equipment should not be exposed. Allergy sufferers, for example, are sensitive to a variety of naturally occurring substances such as pollen, spores, dusts, and animal fur. Such an individual might find relief from symptoms by being in a microenvironment rendered substantially free of allergens by a suitably designed air purification system. A localized working environment that is free of pollutants such as dust is also required, for example, for retouching photographic materials, painting small articles, surgical procedures, and other hobby and professional activities.

Indoor air purification has been achieved up to now by a number of different systems. These systems typically contain a fan or blower that circulates the air through a purification means which can generally be referred to here as a filter. The type of filter is selected in accordance with the contaminant that is to be removed. Several types of filters may be used in combination in a single air purifying unit.

The efficacy of a unit in purifying the air in a room is determined primarily by three factors: (1) the effectiveness of the filters in capturing and retaining the pollutant, (2) the rate at which contaminated air is brought to the filters, and (3) the size of recirculating and quiescent regions in the rooms which are not under the influence of the purification system.

The effectiveness of the filters can henceforth be referred to as the filter efficiency. The rate at which the system purifies air is conveniently measured in terms of the number of room volumes that are treated in a given time, and can be expressed as "air ventilations per hour." A system rated at 10 air ventilations per hour, for example, would treat a volume of air each hour which is equal to 10 times the volume of the room in which it is placed. High rates of air ventilation result in rapid removal of contaminants but normally require large blowers and/or filters.

The size of recirculating and quiescent regions, herein referred to as unventilated zones, is affected by the geometry of the room, the furnishings present in the room, and the location and orientation of the inlet and outlet of the air purification system. Special facilities known as "clean rooms" are designed to reduce the size of the unventilated zones. In typical medical, commercial and residential rooms complete elimination of unventilated zones is generally not feasible.

Particles such as dust, pollen and tobacco smoke are removed from the air by particulate filters, many of which function by a mechanical straining process. Filters with very fine straining elements are used to remove particles as small as tobacco smoke and microorganisms. HEPA (High Efficiency Particulate Air) filters are widely used for fine dusts and are rated at efficiencies ranging from 95% to greater than 99.99% for the capture of particles having an average size of 0.3 micrometers, for example. To prevent premature clogging, a coarse filter or "prefilter" may be used to remove larger particles from the air upstream of the HEPA filter.

Mechanical filters designed to have a high efficiency are characterized by their high resistance to air flow, and as a consequence require large and powerful blowers to achieve acceptable air ventilation rates.

Electrostatic filters may also be used to capture particulate pollutants. These function by placing an electric charge of one polarity on the particles which are then attracted to and retained by plates held at the opposite polarity. The advantage of electrostatic filters is that they offer little resistance to the air flow and so can be used in conjunction with small blowers. A disadvantage is that they generate ozone which is itself considered a pollutant.

Gaseous pollutants such as organic vapors, odoriferous contaminants, and radon may be removed by passing the air through an adsorption type filter. Activated carbon is a commonly used adsorbent that captures a wide range of gaseous pollutants. Other adsorbents such as activated alumina and zeolites may be used for the removal of specific contaminants.

The simplest means of indoor pollution control is to vent the contaminated air to the outside without purification. However, the cost of heating or cooling the large volume of replacement air makes this approach uneconomic. In addition, the practice of discharging pollutants without treatment may not be acceptable, particularly in the case of potentially harmful substances.

Utilizing a central ventilating (HVAC) system for air purification is not satisfactory as these systems do not usually provide more than a few air ventilations per hour, whereas guidelines for certain medical environments recommend up to 20 ventilations per hour. Upgrading an HVAC system to achieve such a high ventilation rate is expensive. Restricting the high flows required to specific rooms only within a building might be less costly, but would require special ducts and booster fans.

Another problem with using an HVAC system for such purpose is that it is customary to recirculate some portion of the ventilation air in the building so as to reduce the amount of air drawn in from outside and the associated costs of heating and air conditioning. However, a contaminant released in one room can consequently be spread throughout the building unless all the recirculating HVAC air is purified. Treating the entire HVAC air flow through high efficiency filters imposes an unacceptably high resistance on the blowers. In addition, poorly located inlet and exhaust registers may result in pollutants being dispersed into other rooms or hallways before being drawn into the return air ducts.

The use of special purpose air-purification systems in a room overcomes many of the shortcomings associated with the use of the HVAC system. Available portable air purification units occupy little space, but are generally too small to achieve acceptably high ventilation rates. Space limitations may preclude the use of larger units unless they are mounted in the ceiling area in which case they suffer from the disadvantage of not being portable. Moreover, the efficacy of these units may be adversely affected by the presence of unventilated zones in the room.

One means of overcoming the problem of unventilated zones is the use of a physical enclosure or booth. The enclosure is made large enough to accommodate a person so that the smoker or patient can be seated inside. The pollutant source is thus contained, and by filtering all the air leaving the booth pollutants can be prevented from dispersing into the ambient air. Physical enclosures, however, suffer from the disadvantage of occupying even more space than conventional air cleaning systems, and they are not readily portable. In addition, the need to place a person in a confined space is intimidating in the case of a patient, and impractical in the case of an office worker, for example.

SUMMARY OF THE INVENTION

The present invention provides an air purification system characterized by high ventilation rates, low space requirements, and portability. The system does not require physical enclosures, and its efficacy is not adversely affected by unventilated zones.

These attributes are achieved by housing the air purifying components in an item of furniture that is normally found in the room in which it is to be used. The system is designed such that the furniture can be used for its customary purpose without interference by the air-purifying components. A chair, for example, is used in most rooms and is the basis for a preferred embodiment of the invention although other items of furniture, such as a table, desk, couch, or bed, may be used.

The air-purifying components consist of air intake ports, prefilters, a blower, the desired purification filters, and a means for directing the discharged air in a manner that enhances the efficacy of the system. An ultraviolet light may be included for applications involving the control of microorganisms. The germicidal properties of ultraviolet radiation serve to militate against pathogenic microorganisms colonizing the filter units and subsequently being blown into the room with the filtered air.

There are two operating modes in which the system can function. In some situations, the system might be required to capture pollutants released in the vicinity of the chair and to prevent them from being dispersed into the ambient air in the room. This is referred to here as the first operating mode and would be selected for control of tobacco smoke or aerosolized drugs, for example. In other situations, the systems might be required to surround the occupant of the chair with a supply of highly purified air. This is referred to as the second operating mode and would be selected for control of external pollutants such as allergens. In either operating mode, the system also purifies the room air in general.

Critical to the efficacy of the system when operating in the first operating mode is that the pollutants released in the vicinity of the chair be pulled toward and drawn into the intake ports. The zone of influence of the intake ports is small and pollutants that are more than a short distance away from these ports are not effectively captured. In accordance with the invention, the movement of the pollutants can be controlled by using the stream of purified air that is discharged from the filter. This air stream entrains the surrounding air and dominates the air flow patterns in the room. As a consequence, pollutant particles are drawn toward the stream of purified air which then carries them into the room away from the intake ports.

By judiciously directing the purified air and by the appropriate use of baffles, a substantial majority of the pollutant particles released above the seat of the chair can be contained within the zone of influence of the intake ports. Such operation can be accomplished by collecting the purified air in a cowling or similar enclosure. The bulk of the air stream is then discharged from the cowling so that it flows past the side of the intake ports that is distant from the pollutant source. Thus, the intake ports lie between the pollutant source and the discharge air stream. The pollutant particles, on being attracted toward the discharge stream, are brought in close proximity to the zone of influence of the intake ports.

By virtue of its high velocity, some portion of the particles is attracted past the intake ports and into the discharge air stream. The number of particles that bypass the intake ports can be reduced by decreasing the quantity of air flowing under each intake port, as by splitting the discharge air into four streams, one stream emerging under the front of the chair, one stream under each side, and a fourth stream directed upward behind the back of the chair.

Placing a baffle such as a curved plate or cylinder in the discharge air streams under the intake ports further increases the efficacy of the system. The baffle accelerates the air flow and effectively increases the attractive power of the discharge stream in the vicinity of the intake ports.

The baffles can serve the additional function of controlling the rate and distribution of the discharge air flow. Moving the baffles closer to the chair increasingly blocks the flow. For example, adjustment of three baffles can be used to balance four discharge air streams to achieve optimum system efficacy.

The size and geometry of the baffle is not critical to the efficacy of the system. However, geometries that overly impede the air flow and redirect it upward have an adverse effect on system efficacy.

In the second operating mode, capture of pollutants by the intake filters is not critical to the efficacy of the system. In this mode, a hood is attached to the back of the chair so that the portion of the discharge air stream that is directed upward is now channelled around the back of the chair in a forward direction toward the area above the seat in the form of a three-sided air curtain that encloses the seat area on the sides and top. Contaminants within the area above the seat are attracted toward the flowing air stream and are swept away while the area above the seat becomes filled with purified air.

Incorporating the air-purification components in an item of furniture has several advantages. Because the furniture can still be used normally, the system does not, in effect, utilize extra space. Because it does not decrease the portability of the furniture item, the system can be readily relocated to other rooms when needed. An important aspect is that the furniture serves as a means of locating the pollution source optimally with respect to the air purification intake ports. The efficacy of the system is not affected by outside influences such as the geometry of the room and nearby furnishings. Another advantage of containing the system in an item of furniture is that any padding and upholstery on the furniture will serve to attenuate noise from the blower.

DESCRIPTION OF THE INVENTION

The foregoing discussion will be understood more readily from the following more detailed description of the invention, when taken in conjunction with the accompanying drawings, in which.

DETAILED DESCRIPTION OF THE PREFERRED EMBODIMENT

Figure 1:
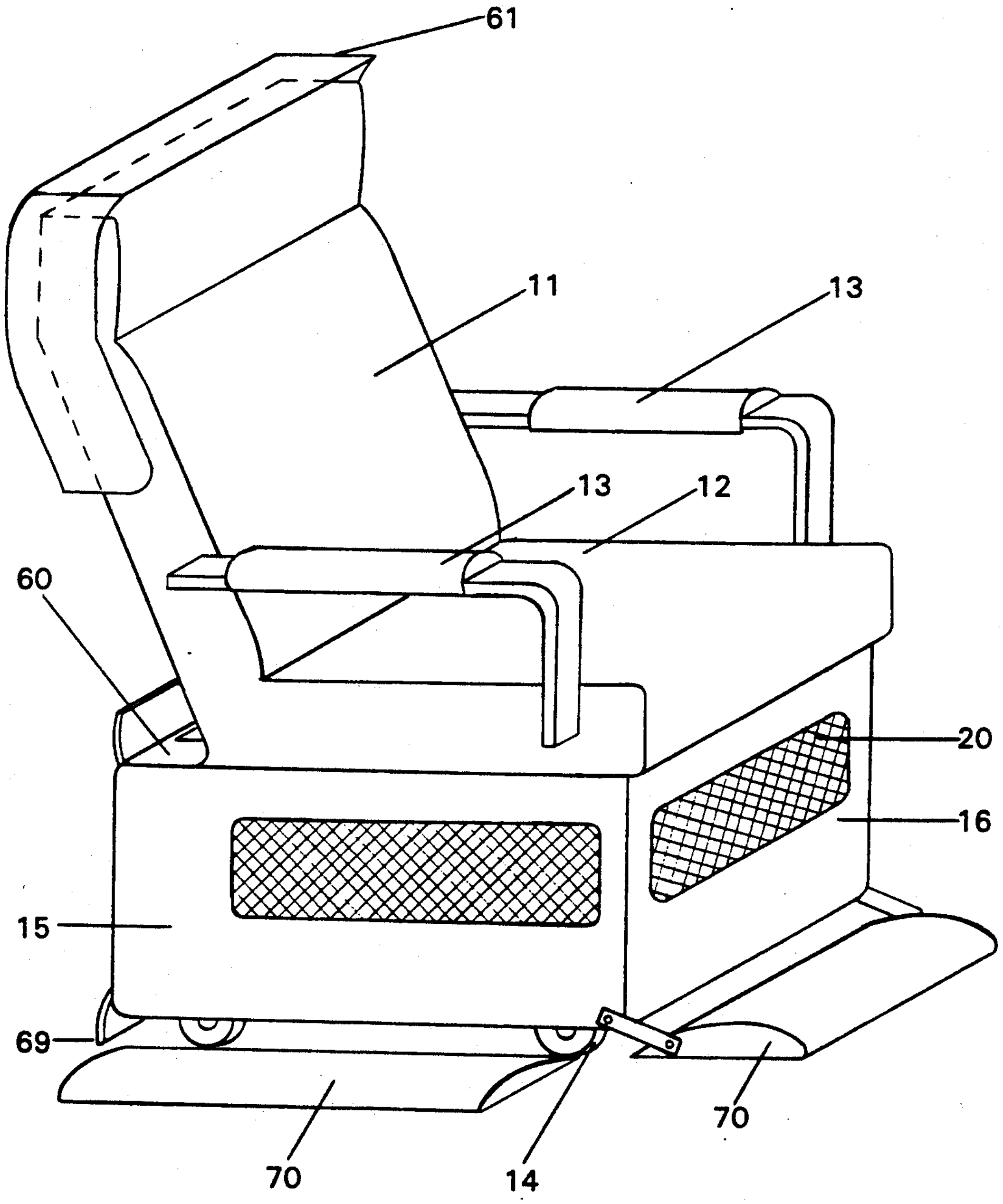
FIG. 1 is a perspective view of an air purification system illustrative of an embodiment of the invention in which the components are housed in an office chair.

Referring to FIG. 1, reference numeral 10 denotes generally a chair which is fitted with air purification components according to a preferred embodiment of the invention. The chair comprises back 11 and a seat 12, as is usual, and a specially designed base 15 which houses the air purification components. The base is supported on castor wheels 14. Armrests 13 are preferably retained as they serve to prevent the occupant of his/her clothing from obstructing the air flow at the sides of the chair.

The specific chair geometry is not critical to the performance of the system so long as it is large enough to accommodate the air-purification components. In a particular embodiment, for example, a seat 12 is 20" deep and 21" in width, and is 20" above the floor. The back rest 11 is 26" high, and its height above the floor is 47". The total depth of the chair from the front of seat 12 to the furthest portion of the back 11 is 27", and the width across the armrests 13 is 29".

The castor wheels 14 are 3" in diameter to facilitate moving the chair. At least one of the wheels should be fitted with a locking mechanism to prevent the chair from moving when in use. The castor wheels are provided for convenience and are not essential to the operation of the system. To prevent the castor wheels from adding unnecessarily to the height of the chair, they are partially recessed in wells in the base 15, such that the bottom of the base is about 2" above the floor.

Figure 2:
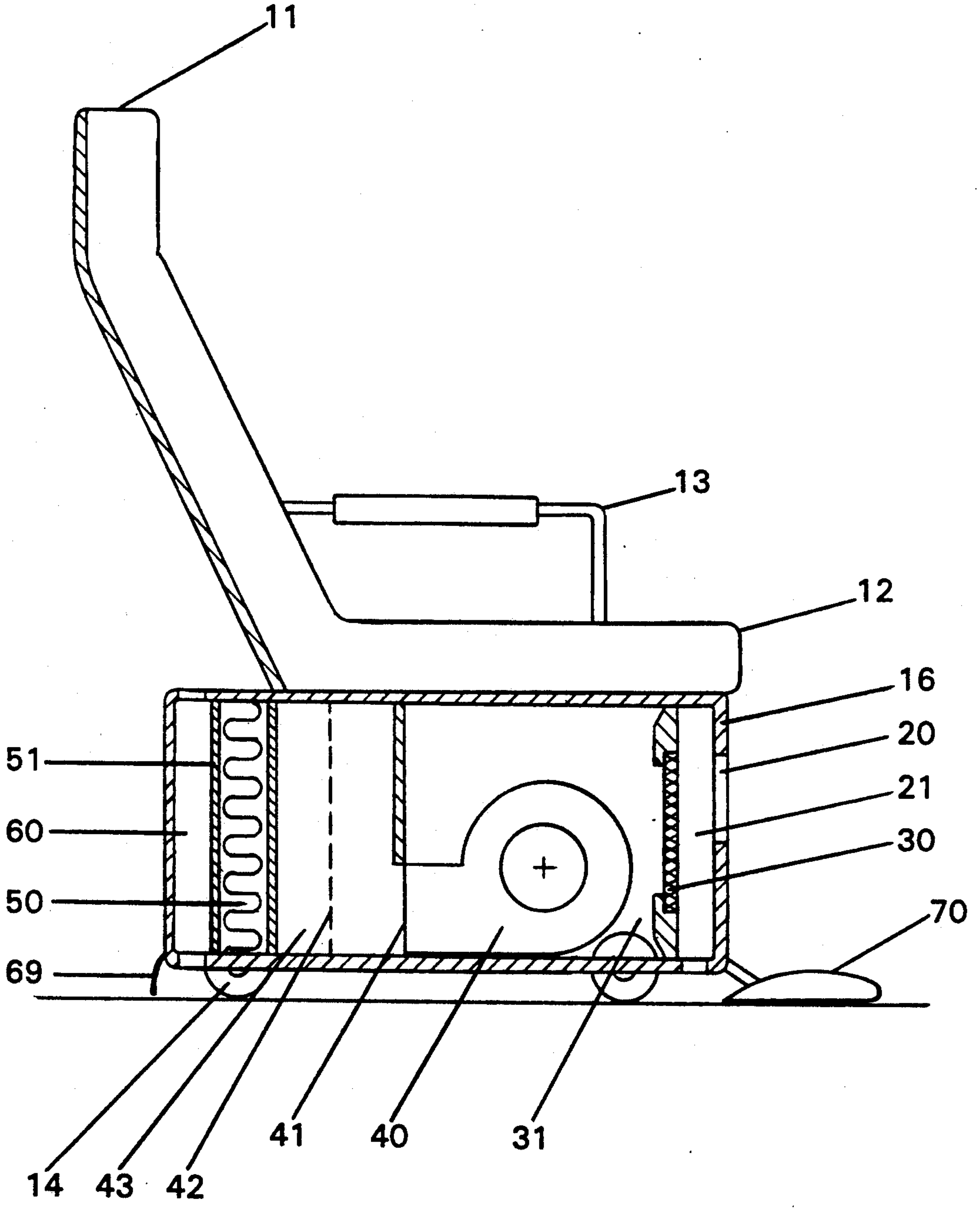
FIG. 2 is a cross-sectional view of the base of the chair of FIG. 1 showing suction and discharge plenums as well as a front prefilter, a blower and a main filter therein.

Referring now to FIG. 2, the base 15 contains a blower 40 as well as one or more prefilters 30 and one or more main filters 50. Three prefilters 30 are conveniently used, one on each side and one on the front of the base. While, in a preferred embodiment, "Dustlok" filters, made and sold by Fiberbond of Michigan City, Ind., for example, can be used and are mounted on a 11.5" by 11.5" wire frame, any other convenient filter material may also be selected for such use. The prefilters should be as large as possible so that they do not significantly impede the air flow. The prefilters are located in a 12" by 12" housing in the walls of the base.

Panels 16 cover the front and sides of the base. The main function of these panels is to improve the appearance of the chair by hiding the prefilters 30 and base 15 from view. The panels are spaced away from the base to form a 2" deep channel 21 for carrying the air flow from the intake ports to the prefilters. The air enters these channels through intake ports 20 in the form of suitable holes cut in the front and side panels and fitted with a grille or similar means for preventing large objects from entering the system. The intake port in the front panel, for example, measures about 16" by 2" and those in the side panels measure about 12" by 4". The intake ports are located centrally in the panels about 4" below the bottom of the seat 12.

As will be described hereinbelow, the purified air is discharged along the floor beneath the chair. To reduce the amount of this purified air stream that might be drawn directly back into the air purification system, the intake ports 20 preferably should be located closer to the seat 12 than to the floor.

The blower 40 provides the required air flow rate and operates against the resistance of the filters and flow channels. For a typical medical examining room having floor dimensions of 10' by 8' and a height of 8', for example, an air treatment rate of 20 ventilations per hour requires an air flow rate of about 200 cubic feet per minute (cfm). The preferred embodiment incorporates a dual centrifugal blower, such as the model 2NB612 blower made and sold by McLean Engineering of Princeton Junction, N.J., measuring approximately 11" high by 10" deep by 12.5 wide. Such blower is rated to provide an air flow rate of 200 cfm against a resistance of up to 0.95" w.g. (water gauge).

Other types of blowers may also be used so long as the blower provides the required air flow rate, is small enough to fit in the available space, and is relatively quiet in operation. The sound level in a preferred embodiment, as measured above the seat, was found to be generally less than 62 dB. In some embodiments, it may be convenient to use a blower with a plurality of speeds such that the system can be operated over a range of purification rates.

The blower outlets are sealed against a face plate 41 which separates the suction plenum 31 from the pressure plenum 43, so preventing the pressurized air that exits the blower outlet from being returned to the inlet ports of the blower. Instead, the exiting air flows through the flow distributor 42 to the main filter 50 where it is purified. The flow distributor is essentially a screen with a fine mesh that serves to redistribute high velocity jets that might exit the blower. In a preferred design, the main filter is a 24" wide by 12" high by 6" deep HEPA filter. HEPA filters having other dimensions are available, and may prove more suitable for embodiments in other alternative furniture items.

A biomedical grade HEPA filter designed to remove 95% of particles of average size of 0.3 micrometers is suitable for the control of aerosolized drugs and microorganisms attached to droplet nuclei. A biomedical filter of the size described above has a resistance to a flow of 200 cfm of about 0.26" w.g. when new. For control of tobacco smoke, a more efficient HEPA filter is needed. The flow resistance might then increase to about 0.5" w.g.

Another type of filter or a combination of filters may be used in place of the biomedical grade HEPA filter that is described above. For example, electrostatic type filters or adsorption type filters might find utility in certain applications. For applications where only a coarse dust is to be controlled, the main filter may even be eliminated altogether, or replaced with coarse filter material.

The filter is located in the filter housing 51 that is coextensive with the pressure plenum 43. An essential requirement of the filter housing is that it locate the filter in such a way as to prevent the pressurized air from leaking past the filter. Filter housings with built-in sealing elements are available commercially and may be incorporated in the design of the present invention.

Figure 3:
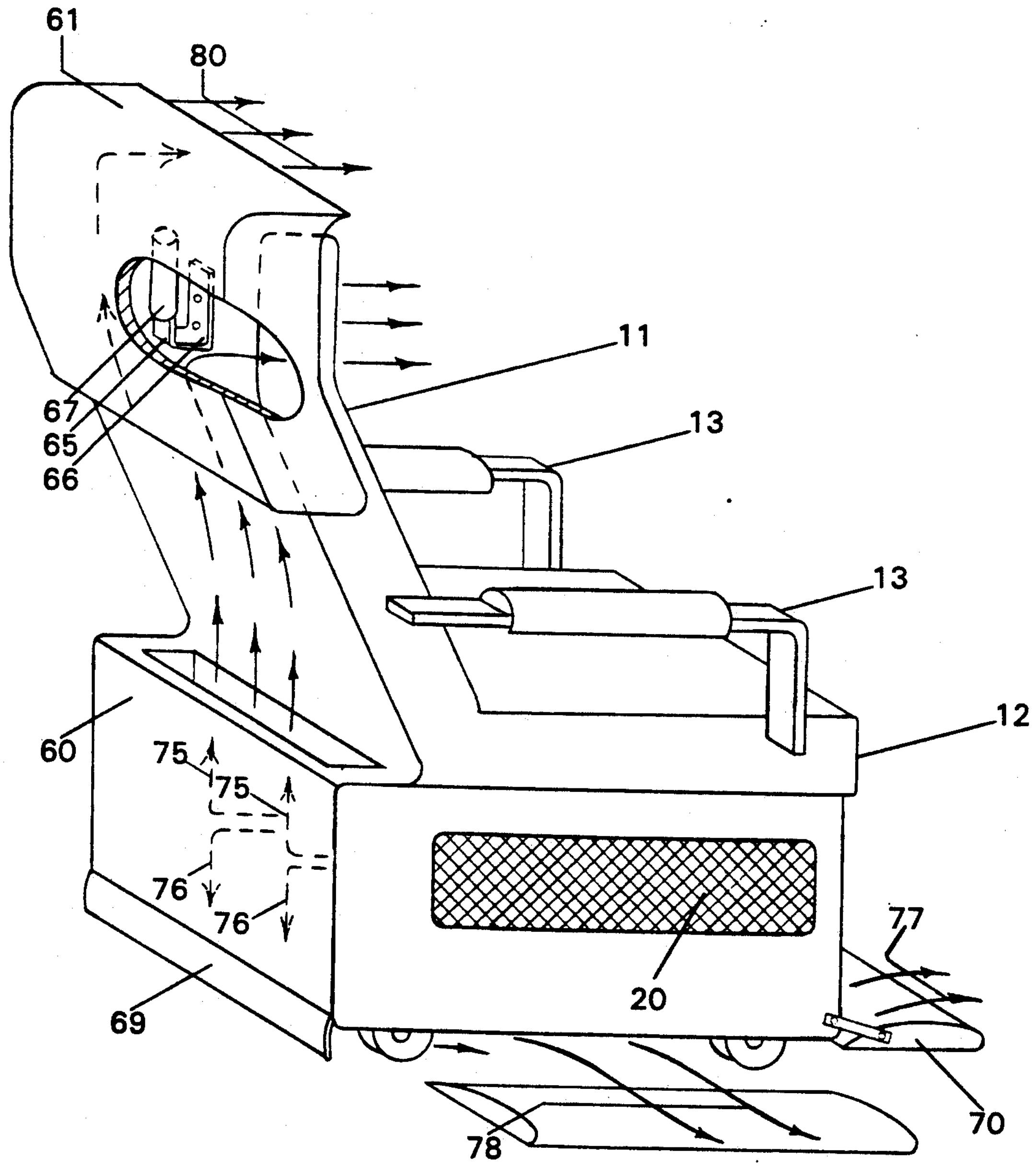
FIG. 3 is another perspective view of the system of FIG. 1 showing the discharge of purified air through a cowling and a hood.

FIG. 3 shows a cowling 60 and a hood 61 that are used to direct the purified air stream that leaves the filter. The cowling 60 forms a chamber behind the main filter 50 that is about 4" deep, and extends from just above the floor to the top of the filter.

The hood 61 is located behind the back of the chair. It is dished at the top and sides to form a loose envelope around the back 11. The spacing between the chair back and the dished ends is about 2" on the sides, and about one-half inch at the top. The hood is attached to the chair back by means of pins 65 on brackets 66 that fit into sockets 67 on the back of the chair. The hood is used only when it is desired to provide a clean microenvironment above the seat. In some embodiments in which the air purification system is to be used only in the first operating mode, the hood 61 is not required.

A skirt 69 is fitted around the base of the cowling. The skirt forms a flexible seal between the cowling and the floor, but does not impede portability of the chair. The skirt serves to insure that the purified air flowing from the bottom of the cowling is directed forward under the chair and does not escape toward the rear from the base of the cowling.

Baffles 70 are located just above the floor at the front and the sides of the base. The air leaving the bottom end of the cowling flows under the chair and past these baffles. In the preferred embodiment, the baffles are curved plates whose section is a segment of a circle with a three-inch rise and nine-inch chord, for example. The location of the baffles relative to the gap between the base of the chair and the floor can be adjusted to achieve the desired flow distribution between the air exiting along the floor from the front and the sides, as well as the amount of air that is directed upward behind the back of the chair. The front baffle can conveniently be used as a foot-rest without detracting from the efficacy of the system. The baffles are pivotally mounted on pins 71 attached to the base 15. When not in use, the baffles can be pivoted on the pins and stored against the panels 16.

One or more ultraviolet light units (not shown) may be located in the cowling 60 in such a way as to act upon the downstream face of the main filter 50. This option is useful in applications where it is necessary to prevent pathogenic microorganisms from growing on the downstream face of the filter and being entrained in the purified air stream. The ultraviolet lights are hidden from view by the cowling.

The function of the components of the system may be better understood from a following description, further in connection with FIG. 3, of the operation of the preferred embodiment shown in FIGS. 1 and 2. The blower 40 creates a suction or negative pressure in the suction plenum 31. This draws surrounding air through the intake port 20, and causes it to flow along the inlet channel 21, and through the prefilters 30. Coarse dust particles are retained on the prefilters, so the air entering the suction plenum contains only fine particles and vapors. The air is then drawn into the suction ports of the blower which causes it to be blown at a positive pressure into the pressure plenum 43.

By virtue of its positive pressure, the air in the pressure plenum is pushed through the filter 50 which retains any contaminants that were not removed by the prefilter. The purified air flows into the cowling 60 from where it is discharged. About 20% of the total discharge stream is directed upward behind the back of the chair (arrows 75), the remaining 80% or so being directed downward and along the floor under the seat (arrows 76). About 30% of the total flow is discharged from the front (arrows 77), and 25% from each side (arrows 78). The efficacy of the system is not critically affected by small variations in these percentages.

To achieve the second operating mode, the hood 61 is lifted into position and held by inserting the pins 65 into sockets 67. The portion of the air flow that is directed upward from the cowling now enters the hood (arrows 79) which directs it around the back 11 toward the front of the chair (arrows 80). This creates a relatively quiescent vortex of purified air in the zone above the seat. Contaminants in the vicinity of the chair are separated from this vortex by a relatively fast moving air stream which entrains them and carries them away.

While the particular embodiment of the invention as described above represents a preferred embodiment thereof, modifications thereto within the spirit and scope of the invention may occur to those in the art. Hence, the invention is not to be construed as limited to the specific embodiment described except as defined by the appended claims.

What is claimed is:

1. An air-purification system for preventing pollutants generated at a localized region of space from being dispersed from said localized region into the surrounding regions of said space, said system comprising:

a structure being positioned in said localized region and having a base which includes a housing;

said base having inlet means for admitting air containing pollutants generated at said localized region into said housing;

air purification means contained within said housing and comprising one or more filters and a blower means for circulating said air containing pollutants through said one or more filters;

said base having outlet means for distributing the air flowing from said one or more filters into two or more separate filtered air streams and;

means for causing said filtered air streams to be directed so as to provide controlled amounts of air flowing in each of said two or more separate filtered air streams for drawing pollutants in the air from said localized region toward said inlet means.

2. An air-purification system in accordance with claim 1 and further wherein said causing means includes baffles positioned with respect to the base of said structure so as to enhance the directing of said controlled amounts of filtered air streams and thereby enhancing the drawing of pollutants from the air in the localized region of the structure towards the inlet means.

3. An air-purification system in accordance with claim 1 wherein said causing means provides about 20% of the filtered air in said filtered air streams to be diverted upwardly behind said base toward said localized regions and about 80% thereof to be directed downwardly in front of and at the sides of said base.

4. An air-purification system according to claim 1 wherein said structure is an item of furniture.

5. An air-purification system according to claim 4 wherein said item of furniture is a chair having a back and seat above said base.

6. An air-purification system according to claim 5 and further wherein said causing means includes baffles disposed at the front and the sides of the base of said chair so as to enhance the directing of said controlled amounts of filtered air streams and thereby enhance the drawing of pollutants from the air in the localized region of the chair toward the inlet means.

7. An air-purification system according to claim 5 and further including further flow directing means for causing a portion of filtered air to flow from behind the back of the chair in a forward direction over and around the seat.

* * * * *